United States Patent [19]

Hopper

[11] Patent Number: 5,318,317
[45] Date of Patent: Jun. 7, 1994

[54] BICYCLE OPERATED AIR PUMP

[75] Inventor: Buford H. Hopper, Bothell, Wash.

[73] Assignee: Velo Research, Inc., Lynnwood, Wash.

[21] Appl. No.: 808,049

[22] Filed: Dec. 12, 1991

[51] Int. Cl.⁵ ............................................. B62J 11/02
[52] U.S. Cl. ..................................... 280/201; 417/63;
    417/231; 417/233; 417/537; 152/416; 24/528
[58] Field of Search .................................. 24/527, 528

[56] References Cited

U.S. PATENT DOCUMENTS

| | | | |
|---|---|---|---|
| 540,252 | 6/1895 | Harding | 2/528 |
| 559,418 | 5/1896 | Spencer | 417/233 |
| 596,223 | 12/1897 | Wickersham et al. | |
| 624,417 | 1/1899 | Wickersham et al. | |
| 652,997 | 7/1900 | Crandall | |
| 681,565 | 8/1901 | McCune et al. | |
| 744,483 | 11/1903 | Carlberg | |
| 797,447 | 8/1905 | Merry | |
| 868,658 | 10/1907 | Hamacher | |
| 1,169,705 | 1/1916 | Wilkes | |
| 1,349,225 | 8/1920 | Rosenblum | 24/527 |
| 1,455,646 | 5/1923 | Millard | 417/63 |
| 1,760,346 | 5/1930 | Correa | 24/527 |
| 2,472,647 | 6/1949 | Covins | |
| 2,662,261 | 12/1953 | Mikoski | 24/528 |
| 3,053,194 | 9/1962 | Webster | 417/537 |
| 3,233,554 | 2/1966 | Huber et al. | 417/534 |
| 3,283,997 | 11/1966 | Bambenek et al. | |
| 3,451,276 | 6/1969 | Wadlow et al. | |
| 3,510,923 | 5/1970 | Blake | 24/528 |
| 3,517,652 | 6/1970 | Albertson | |
| 4,137,020 | 1/1979 | Ito et al. | 417/534 |
| 4,462,768 | 7/1984 | Westmoreland | 417/534 |
| 4,677,328 | 6/1987 | Kumakura | |

FOREIGN PATENT DOCUMENTS

| | | |
|---|---|---|
| 3304071 | 3/1973 | Australia . |
| 480975 | 12/1949 | Belgium . |
| 893307 | 10/1953 | Fed. Rep. of Germany . |
| 3839076 | 1/1989 | Fed. Rep. of Germany . |
| 248366 | 2/1948 | France ................................ 417/233 |
| 724960 | 2/1955 | United Kingdom . |

Primary Examiner—Richard A. Bertsch
Assistant Examiner—Michael I. Kocharov
Attorney, Agent, or Firm—Christensen, O'Connor, Johnson & Kindness

[57] ABSTRACT

An air pump for use with a chain-driven bicycle having a freewheel. The pump assembly comprises a pair of opposed cylinders and a double-ended piston rod mounted in a housing. The piston rod has a bearing slot which engages a crank pin on a crankshaft which is driven by a sprocket. Rotation of the sprocket reciprocates the double-ended piston rod in the cylinders. A hook-shaped extension of the housing fits over the top of the chain stay of the bicycle, and a vertically movable clamping member provided with a ratchet mechanism abuts the underside of the chain stay; a lever operated cam clamps the chain stay intermediate the hook portion and the clamping member. The lower run of the bicycle drive chain engages the drive sprocket of the pump assembly. Reverse rotation of the bicycle's crank assembly causes the conventional freewheel to also rotate in a reverse direction without rotating the wheel of the bicycle. The resulting movement of the chain over the drive sprocket of the pump rotates the drive sprocket, which reciprocates the double-ended piston rod in the cylinders and pumps air to an article to be inflated.

17 Claims, 7 Drawing Sheets

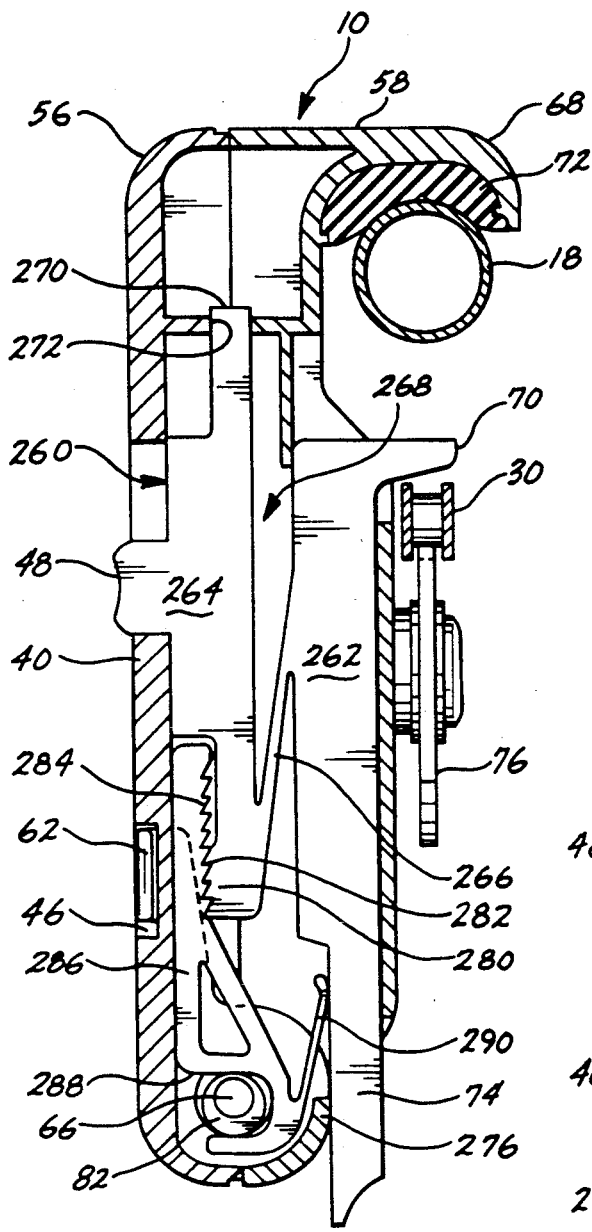
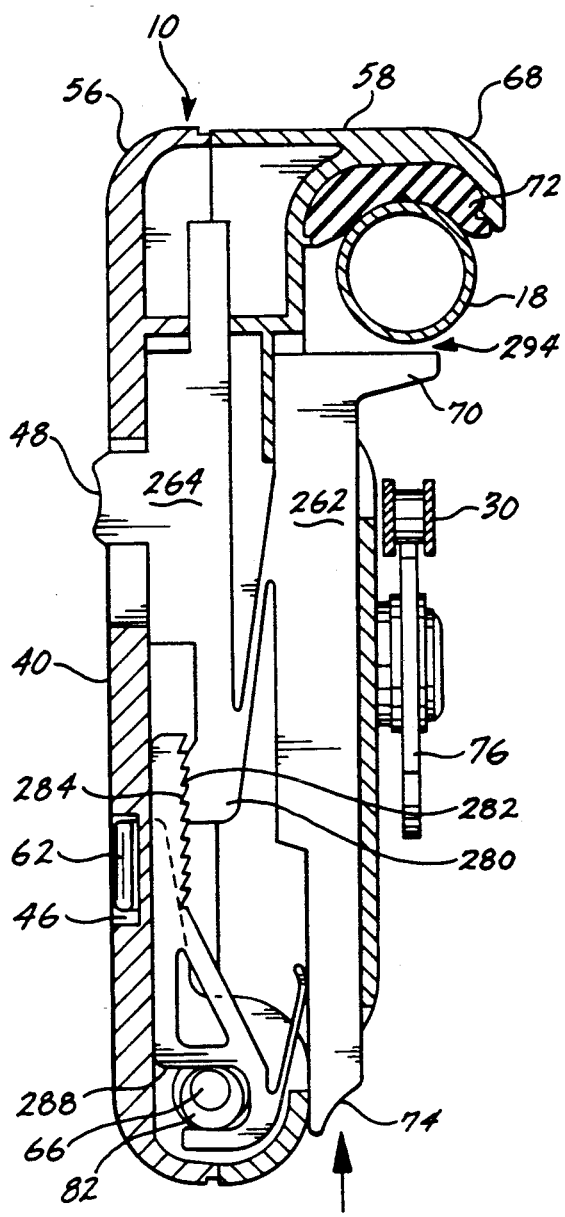

BICYCLE OPERATED AIR PUMP

BACKGROUND OF THE INVENTION

1. Field of the Invention

The present invention relates generally to air pumps. More particularly, the present invention relates to an air pump which is operated by the drive chain of a bicycle.

2. Background Art

Air pumps have long been employed to inflate various articles, such as pneumatic tires, air mattresses, footballs and basketballs, inflatable toys, and the like. By their very nature, many of these articles need to be inflated in field environments, far from filling stations or other facilities having installed air compressors. Consequently, a great many types of portable air pumps have been used or proposed, with varying degrees of success.

Perhaps the best known example of a portable air pump is the hand-operated reciprocating type, which is frequently carried clipped to the frame tubes of a bicycle. These pumps typically have a single-acting piston and cylinder, the piston being operated by means of a long rod to which a handle is attached: the cylinder and handle are gripped in opposite hands and reciprocated back and forth to drive air out of the cylinder and into the article to be inflated. While these typical hand-operated reciprocating air pumps have the advantage of simplicity, they also exhibit a number of shortcomings. Firstly, they are fairly slow to operate, the speed of the reciprocating action being limited to that with which the operator can move his hands back and forth relative to one another. This disadvantage becomes quite burdensome when inflating relatively large articles which require significant volumes of air. Furthermore, inasmuch as the handle operates directly on the piston rod, these pumps provide no mechanical advantage to assist the operator; consequently, it can be very difficult to attain high air pressures (as required by many modern bicycle tires) using such pumps. Moreover, since such pumps typically employ pistons and cylinders having small diameters and very long strokes, they are ordinarily quite long and thus difficult to stow. The long cylinders and piston rods are also typically made of metal, rendering it difficult to make such pumps as light as may be desired.

The need for portable air pumps which are compact, light, and fast acting has become more pronounced in recent years, particularly with the advent of very lightweight bicycles. For example, speed of operation and minimum weight can be crucial factors in various competitive events, such as triathalons, which involve the use of bicycles.

A number of attempts have been made to employ the drive system or motion of the bicycle itself to operate an air pump. For the most part, these pumps have been mounted to turn with the wheel of the vehicle so as to inflate the tire while the vehicle is in motion. For example, U.S. Pat. No. 1,169,705 to Wilkes (1916) shows a pumping apparatus having a pump cylinder, with a piston being positioned in the cylinder and having a piston rod. This assembly is mounted to the hub of the wheel (in this case, that of a motorcycle), and rotates therewith. There is a linkage having a roller which extends out through the spokes of the wheel so as to be activated by a track which is fixed to the frame of the vehicle, causing the piston rod and piston to reciprocate so as to pump air through a flexible hose into the tire on the wheel.

A variety of other air pumps have been proposed which, like that of Wilkes, are mounted to the hub of a wheel so as to rotate therewith and pump air to a tire on the wheel. For example, U.S. Pat. No. 797,447 to Merry (1905) shows a rotating, hub mounted piston assembly which engages a slanted disc on the frame of the bicycle so as to impart a reciprocating motion to the piston. U.S. Pat. No. 744,483 to Carlberg (1903) shows a pump assembly which rotates with the wheel and which has a lever which extends from the wheel and cooperates with a fixed cam plate on the bicycle frame so as to reciprocate the cylinder along a wire guide which is fixed to the wheel rim. U.S. Pat. No. 652,997 to Crandall (1900) shows a pump assembly which rotates with the wheel of a bicycle and which has a protruding cam follower which engages an eccentric cam mounted to the bicycle frame so as to impart a reciprocating motion to a piston in the pump cylinder. U.S. Pat. No. 624,417 to Wickersham et al. (1899), U.S. Pat. No. 596,223 to Wickersham et al. (1897), and U.S. Pat. No. 559,418 to Spencer (1896) show varieties of air pump arrangements having pinion gears which protrude from the rotating pump assemblies and engage larger stationary gears which are mounted to the vehicle frames; rotation of the pinion gears operates crank arms which in turn reciprocate pistons of the pumps.

A variety of other devices have been proposed which are driven by the chain and sprocket drive of a bicycle, or which otherwise utilize the rotational motion of bicycle components. For example, U.S. Pat. No. 681,565 to McCune (1901) shows a fan which is mounted adjacent to the handlebars of a bicycle, the blades of which are rotated by means of a belt drive from the crank assembly of the bicycle. U.S. Pat. No. 868,658 to Hamacher (1907) discloses a bicycle in which movement of the rider's feet apparently reciprocates pump cylinders to generate compressed air which acts against vanes of a drum to cause rotation of a shaft which is presumably attached to a drive for the back wheel. U.S. Pat. No. 3,283,997 to Bambenek et al. discloses a portable ventilator in which a stationary bicycle has a chain and sprocket drive which rotates a large pulley, which in turn drives a belt that provides power to the ventilating apparatus. U.S. Pat. No. 4,677,328 to Kumakura discloses a bicycle generator having a stator which is fixed to the bicycle frame and a rotor which rotates with the flange of the wheel.

It will be appreciated that each of the above-described bicycle-driven devices adds undesirable weight to the bicycle to which it is mounted. Furthermore, notably with respect to the air pumps, many of these devices are characterized by complicated, heavy, and inefficient mechanical linkages. The rotating pump assemblies would also have a deleterious effect on the balance of the wheels to which they are affixed. Furthermore, inasmuch as these devices operate while the vehicle is in motion, they would appear to be able to inflate only that tire which rotates on the wheel together with the pump: these devices are thus unsuitable for inflating the other tire of the bicycle, or for inflating articles which are separate from the bicycle, such as air mattresses, footballs, or the like.

A number of air pumps are known apart from those which are bicycle driven. Amongst these is that shown in U.S. Pat. No. 2,472,647 to Convins (1949), which discloses a double-acting reciprocating pump in which there are two pistons having an interconnecting element. The interconnecting element has a slot which extends at right angles to the direction of reciprocation of the pistons, and which is also at right angles to the axis of a crank. An end portion of the crank arm is received in the slot and as the crank arm rotates, the interconnected pistons are moved back and forth for the pumping action. There are inlet and outlet valves for each cylinder, the outlet valves being able to be connected to a common output line so as to obtain a more or less constant flow of air from the pump. Similar piston-cylinder arrangements are shown in U.S. Pat. No. 3,517,652 to Albertson (1970), which discloses a two-stroke engine, and U.S. Pat. No. 3,451,276 to Wadlow et al. (1969), which discloses an actuator mechanism. None of the devices described in this paragraph is adapted for use with a bicycle drive mechanism.

Accordingly, there is a need for a portable air pump for inflating bicycle tires and other articles, which is light in weight, and efficient and fast in operation. Furthermore, there is a need for such a device which provides a mechanical advantage so as to permit an operator to inflate articles to high pressures, as well as for such a device which is compact and readily stowable.

SUMMARY OF THE INVENTION

The present invention has solved the problems cited above, and comprises an air pump for use with a bicycle having a frame and a chain drive in which a crank assembly and a free wheel gear cluster are interconnected by a drive chain. The air pump includes a housing, at least one cylinder mounted in the housing, a piston positioned in the cylinder for reciprocating motion, and a crank shaft for reciprocating the piston in the cylinder through an intake stroke and a compression stroke in response to rotation of the crank shaft. Means are provided for admitting air into the cylinder during the intake stroke, and for venting the compressed air from the cylinder during the compression stroke. A drive sprocket is mounted to the crank shaft for engaging the drive chain of the bicycle, and means are provided for mounting the housing to the frame of the bicycle so that the drive sprocket is in engagement with the drive chain. Rotation of the crank assembly of the bicycle consequently moves the drive chain over the drive sprocket of the air pump, causing rotation of the drive sprocket and reciprocation of the piston in the cylinder.

Preferably, there are first and second cylinders arranged in an opposed relationship to one another. A double-ended piston rod is provided which has a first piston head positioned in the first cylinder and a second piston head positioned in the second cylinder. The piston rod has a bearing slot in its middle portion which extends at a right angle to the longitudinal axis of the piston rod. The crank pin on the crankshaft is positioned in the bearing slot so that the piston rod reciprocates in response to rotation of the crankshaft.

A cylinder head is mounted on the outer end of each cylinder sleeve, and a manifold is mounted to each cylinder head so as to form a manifold chamber over the cylinder head. An exhaust port is provided through each cylinder head for permitting the compressed air to flow from the cylinder sleeve into the manifold chamber. A cylindrical nipple extends from the cylinder head into the manifold chamber, and has a T-shaped exhaust passage therein which has an inlet end in communication with the exhaust port and a pair of outlet ends at the cylindrical wall of the nipple. An elastomeric sleeve surrounds the cylindrical wall of the nipple so that the sleeve expands outwardly about the nipple to release the compressed air through the outlet openings in response to the air pressure in the cylinder sleeve exceeding that in the manifold chamber during the compression stroke; the sleeve contracts about the nipple to seal the outlet openings during the intake stroke.

There is at least one cylinder port through the cylinder sleeve for admitting air into the cylinder sleeve during the intake stroke. The cylinder port opens when the piston head is proximate the end of the intake stroke. A U-cup seal is mounted in a circumferential groove in each piston head, the U-cup seal having an outer rim which flexes inwardly during the intake stroke so as to form a gap for admitting air intermediate the piston head and the cylinder sleeve. The outer rim of the seal flexes outwardly during the compression stroke so as to close the gap.

One of the manifolds is provided with a fitting for an air hose for supplying compressed air to an article to be inflated. An equalizer tube interconnects the manifolds so as to permit the compressed air to flow from the other manifold to the manifold having the air hose fitting.

A pressure gauge assembly is also provided. A pressure indicator tube is mounted to a first manifold so that compressed air enters a first end of the tube, and a pressure indicator rod is positioned for longitudinal movement in the pressure indicator tube. The rod extends from an open end of the pressure indicator tube, so that a pressure differential between the compressed air in the manifold and the atmosphere will tend to move the rod in the tube. A guide rod extends axially from the pressure indicating rod into a guide tube which has a closed end mounted to the second manifold. A coil spring surrounding the guide rod extends from the end of the indicating rod to the end of the guide tube to regulate the movement of the indicating rod. A marking on the indicating rod is visible through a window in the housing of the pump; the position of the indicator marking is compared with a scale on the housing to determine the pressure of the compressed air in the manifold.

The means for mounting the air pump to the bicycle comprises a hook portion which extends rearwardly from the upper end of the housing, and a vertically movable jaw member having a mandible portion which extends from the housing below the hook portion so as to define a gap for receiving the chain stay of the bicycle frame. Both the jaw member and a locking member are movable in a direction vertical in the housing, and are interconnected by an angled bridge member which yieldingly biases the locking and jaw members apart, and which transmits force in a vertical direction from the locking member to the jaw member. The locking member has ratchet teeth which are configured to engage ratchet teeth on a ratchet actuator so that the locking member is movable in the housing only in an upward direction. A portion of the jaw member extends downwardly out of the housing to form a push rod for manually moving the jaw member and locking member upwardly until the mandible is proximate the lower side of the chain stay. A cam is mounted in vertical abutment with the locking member, and a lever is provided for selectively rotating the cam. As the cam is rotated from a first position to a second position, the locking member moves upwardly in the housing so that the chain stay is gripped intermediate the hook portion of the housing and the mandible.

A release button is provided which extends from the locking member so that pressure can be applied manually to overcome the bias of the bridge member and move the locking member towards the jaw member, and away from the ratchet actuator. This disengages the ratchet teeth so that the locking member and jaw member are free to move downwardly in the housing to release the chain stay.

Other features of the present invention will become apparent from the following detailed description.

BRIEF DESCRIPTION OF THE DRAWINGS

FIGS. 9-11 are end views of a section through the air pump of FIGS. 1-8, taken along line 9—9, showing the sequential steps in the use of the internal ratchet mechanism of the air pump assembly to secure the pump to the bicycle.

DETAILED DESCRIPTION OF THE INVENTION

Figure 1:
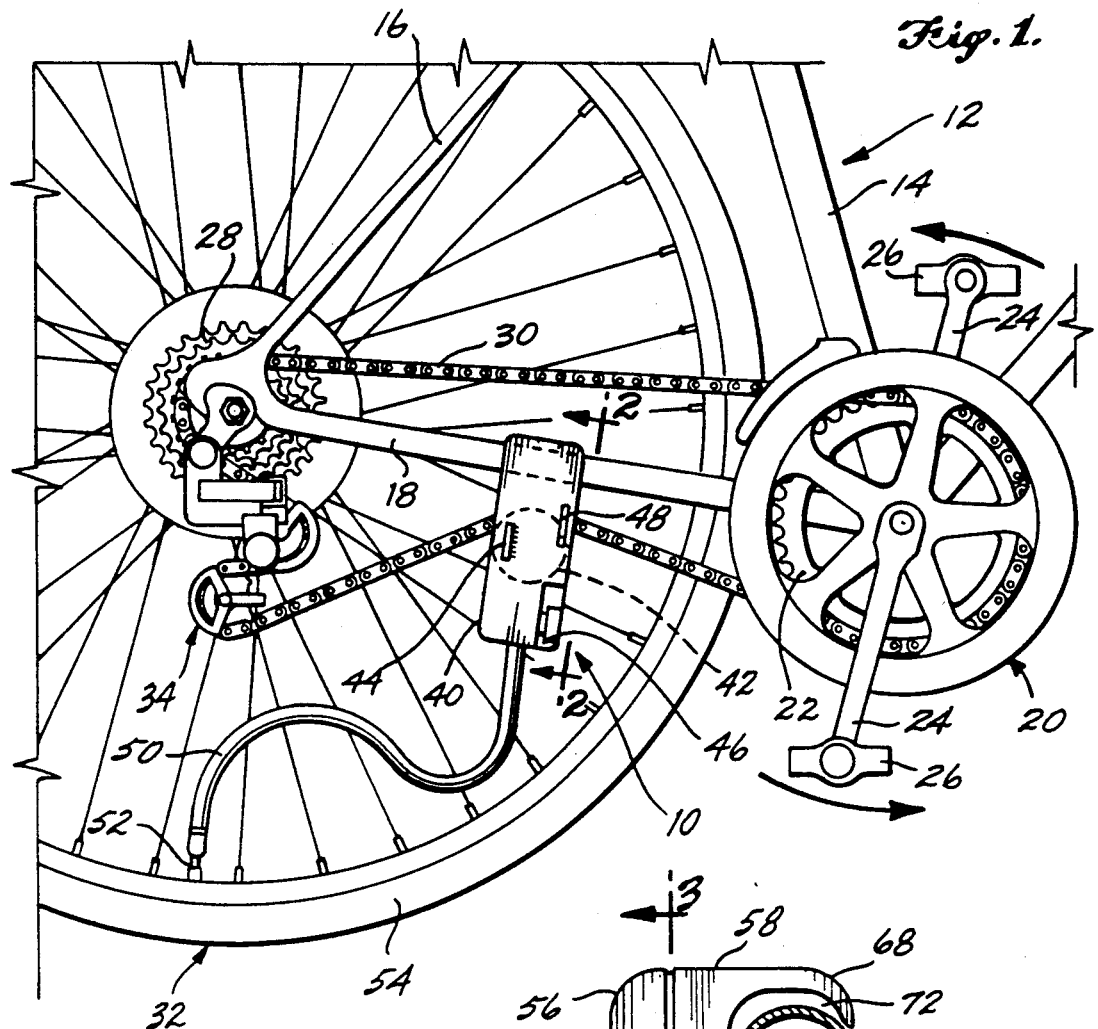
FIG. 1 is a side view of a portion of a bicycle, having an air pump incorporating the present invention mounted thereto so as to be driven by the chain of the bicycle in order to inflate the rear tire thereof.

FIG. 1 shows an air pump 10 incorporating the present invention mounted to a bicycle which is indicated generally by reference numeral 12. Bicycle 12 includes a conventional frame having a seat tube 14, seat stays 16, and chain stays 18. A crank assembly 20 is rotatably mounted to the frame at the junction of seat tube 14 and chain stays 18. Crank assembly 20 includes one or more chain rings 22, to which are fixed crank arms 24 which extend radially beyond the outer radii of chain rings 22 and which have pedals 26 mounted to the outer ends thereof. Crank assembly 20 can be rotated in either a forward or reverse direction (clockwise or counter-clockwise, respectively, as shown in FIG. 1) by an operator's feet or hands.

A conventional free-wheel gear cluster 28 is mounted to the frame at the junction of seat stays 16 and chain stays 18. Conventional free-wheel gear cluster 28 is provided with an internal clutch or ratchet system which engages to transmit torque to rotate wheel assembly 32 when tension is applied to drive chain 30 in a forward direction (clockwise in FIG. 1) by crank assembly 20. When the bicycle coasts, or crank assembly 20 is peddled in a reverse direction (counterclockwise in FIG. 1), however, the ratchet mechanism of freewheel gear cluster 28 disengages so that rotation of freewheel gear cluster 28 and wheel 32 are independent; in other words, when freewheeling, wheel 32 rotates without rotating freewheel gear cluster 28, and, conversely, freewheel gear cluster 28 can be rotated in a reverse direction without causing rotation of wheel 32. In an also conventional manner, drive chain 30 is routed about, and engaged by, chain ring 22 and an individual sprocket or gear of freewheel gear cluster 28 so that crank assembly 20 and freewheel cluster 28 are interconnected by upper and lower chain runs. As is conventional, freewheel cluster 28 is provided with a plurality of individual sprockets; other conventional freewheels are known which have only a single rear wheel sprocket. Selective shifting of chain 30 between individual sprockets of freewheel cluster 28, so as to change gear ratios, is accomplished by means of a conventional rear derailleur 34. In normal operation, rear derailleur 34 maintains spring tension on drive chain 30 intermediate chain wheel 22 and freewheel gear cluster 28.

Air pump assembly 10 is mounted to bicycle 12 so that upper portion of housing 40 is hooked over chain stay 18, and the lower run of drive chain 30 is deflected from its normal path of travel, as indicated in FIG. 1, and is routed over a drive sprocket which protrudes from the rear of housing 40, as is indicated generally by broken line image 42. The spacing or gap between the drive sprocket 76 (the broken image outline of which is identified by reference numeral 42 in FIG. 1) and the upper hook portion 68 of housing 40, as described hereinafter, is selected, and the size of sprocket 76 is chosen, so that when the chain is deflected from its ordinary path of travel, as illustrated in FIG. 1, the tension in the chain (applied by the rear derailleur) will increase, thereby ensuring the lower run of the chain remains in driving engagement with the sprocket.

The front face of housing 40 is provided with a pressure gauge window 44, a clamping lever 46, and a release button 48, the objects and use of each of which will become apparent from the description provided below. Furthermore, an air hose 50 extends outwardly from housing 40, and is connected in a conventional manner to an inflation valve 52 of bicycle tire 54. Air hose 50 is shown in FIG. 1 as reaching the rear tire 54 of bicycle 12, however, it will be understood that air hose 50 will preferably be of sufficient length to reach other inflatable articles, such as, for example, the front wheel of bicycle 12.

With air pump assembly 10 mounted on bicycle 12 as shown in FIG. 1, an operator can rotate crank assembly 20 in a reverse direction, so as to cause drive chain 30 and freewheel gear cluster 28 to rotate in the same direction without causing rotation of wheel assembly 32 or movement of bicycle 12. As the lower run of drive chain 30 passes over the sprocket of air pump assembly 10, it causes that drive sprocket to rotate (in a clockwise direction in FIG. 1), operating the pump mechanism which is enclosed in housing 40.

Figure 2:
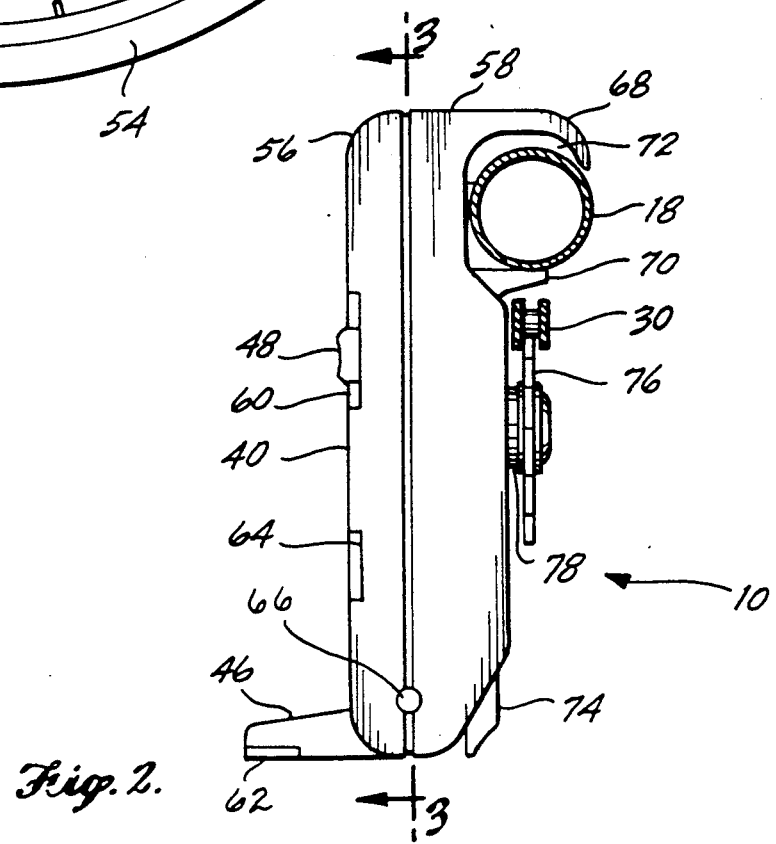
FIG. 2 is an end view of the air pump shown in FIG. 1, taken along line 2—2.

FIG. 2 shows an end view of pump assembly 10. Housing 40, which may preferably be fabricated of a suitable high strength plastic such as polycarbonate, comprises generally a front case section 56 and a rear case section 58. Front case section 56 has an opening 60 through which release button 48 protrudes so as to be easily actuated by the thumb or finger of an operator. Furthermore, clamping lever 46 extends, when in the clamped position, in a generally perpendicular direction from front case section 56; ear 62, which extends generally at a right angle from clamping lever 46 so as to make it easier to grip, is received in a recess 64 in front case section 56 when clamping lever 46 is in the released position. Clamping lever 46 is attached to pivot pin 66, which is received in a cooperating bore in housing 40, so as to be pivotable between the released and clamped positions.

As will be described in greater detail below, to mount air pump assembly 10 to a bicycle 12, pump assembly 10 is positioned about chain stay 18 so that chain stay 18 is received in a gap intermediate a rearwardly extending hook portion 68 of rear case section 58 and a mandible portion 70 of a vertically movable clamping member which is housed within housing 40. A resilient cushioning insert 72 is fitted within the interior of hook portion 68 so as to provide a yielding grip when chain stay 18 is clamped intermediate mandible portion 70 and hook portion 68; this arrangement reduces the risk of damage to both the chain stay and the internal clamping mechanism of pump assembly 10. Cushioning insert 72 may be made of any suitable resilient material, such as, for example, polyurethane foam, synthetic or natural rubber, or the like. A plurality of interchangeable cushioning inserts having gripping faces contoured to accommodate a variety of different-sized chain stays may be provided; typical conventional chain stays taper and have midsection diameters ranging between about $\frac{5}{8}$ inch and 1 inch.

The lower end of the clamping member to which mandible portion 70 is mounted protrudes from the bottom of rear case section 58 to provide a hand-actuated push rod 74, the use of which will also be described in greater detail below.

With further reference to FIG. 2, drive chain 30 is shown routed over drive sprocket 76, which in turn is fixed to crankshaft 78. As was noted above, the spring tension applied by rear derailleur 34 maintains drive chain 30 in drive engagement with the upper portion of drive sprocket 76. As used in this description and the appended claims, the term "sprocket" includes any gear, friction wheel, pulley wheel, or other form of wheel for engaging chain 30. Drive sprocket 76 may preferably be provided with approximately 10 teeth, while conventional chain rings 22 may typically have between 38 and 52 teeth; accordingly, a significant gear ratio reduction is achieved between chain rings 22 and drive sprocket 76, which, in addition to the length of crank arms 20, provides the operator with a substantial mechanical advantage in operating air pump assembly 10.

Figure 3:
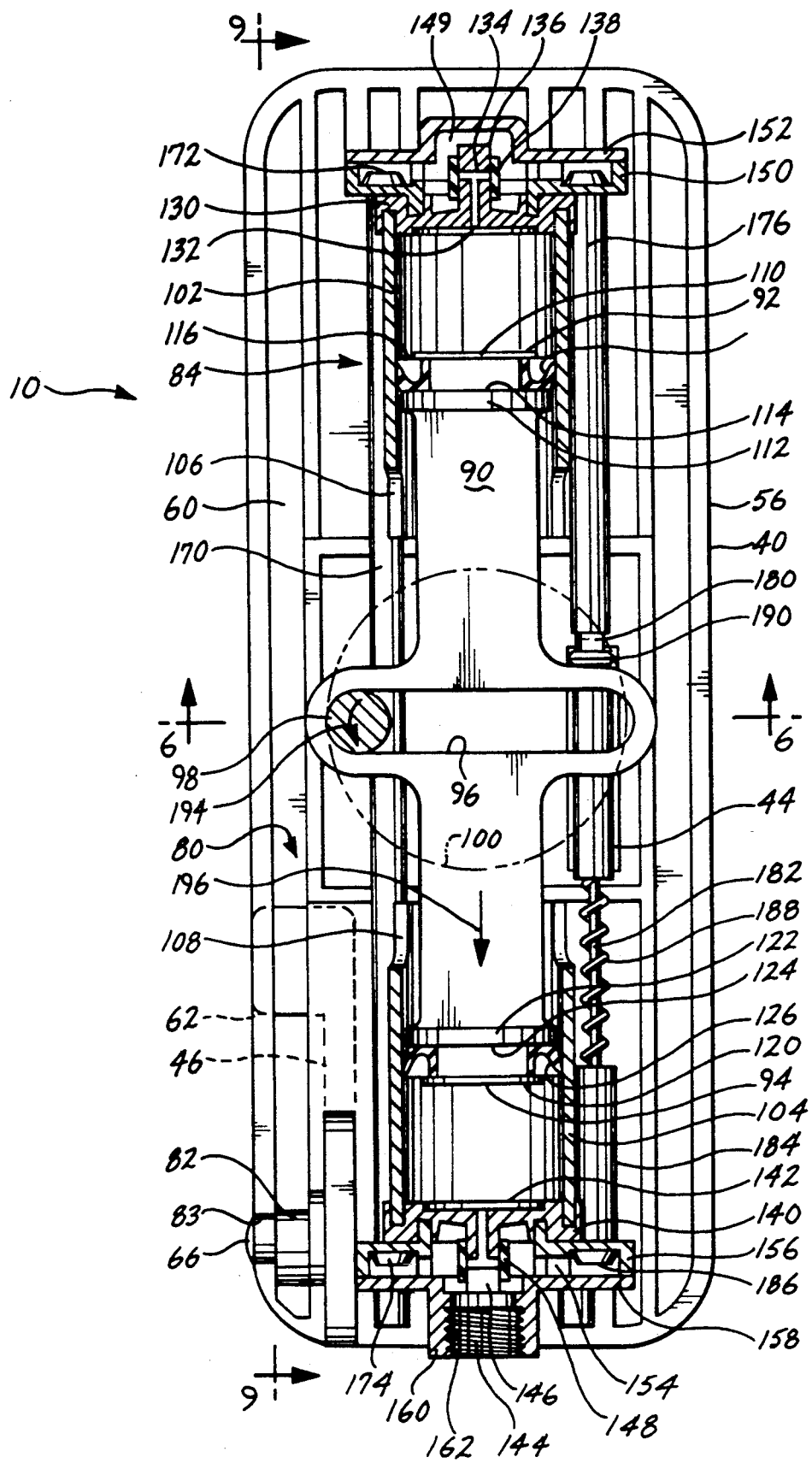
FIG. 3 is a side view of a section through the air pump shown in FIG. 2, taken along line 3—3, showing the arrangement of the cylinders, pistons, and other components within the housing of the air pump.

Turning now to FIG. 3, the internal components of air pump assembly 10 will now be described in greater detail. FIG. 3 is a rear view of a section through air pump assembly 10. Case section 56 is provided with a vertically extending guide slot 80, which accommodates the vertically moving clamping member and associated parts which will be described below. In the upper portion of guide slot 80 is the opening 60, through which release button 48 protrudes. At the base of guide slot 80 is a cam 82 which is mounted to pivot pin 66. Pivot pin 66 is rotatably mounted in cooperating bore 83 in housing 40. Clamping lever 46 is also mounted to pivot pin 66, so that movement of clamping lever 46 from the released position to the clamped position causes rotation of cam 82.

Housing 40 also encloses the double-acting air pump section, as indicated generally by reference numeral 84. Air pump section 84 includes a double-ended piston rod 90 having a first piston head 92 at its upper end and a second piston head 94 at its lower end. Double-ended piston rod 90 is preferably constructed of a strong, resilient, lightweight material having good wear characteristics, such as, for example, a moldable acetal engineering plastic available under the name Delrin ™ from E. I. DuPont de Nemours & Company, Polymer Products Department, Market Street, Wilmington, Del. Double-ended piston rod 90 is also provided with a central bearing slot 96 having an extent which is perpendicular to the longitudinal axis of piston rod 90. Bearing slot 96 receives a crank pin 98 which is mounted eccentrically on a crank wheel, indicated generally by broken line image 100 in FIG. 3, which in turn is mounted to crankshaft 78 (shown in FIG. 2). Rotation of the crank wheel drives crank pin 98 in bearing slot 96 so as to produce translational, reciprocating motion of double-ended piston rod 90. Crank pin 98 may be sleeved with an external bushing to enhance wear characteristics.

Piston head 92 is received in upper cylinder sleeve 102, and lower piston head 94 is received in lower cylinder sleeve 104. Cylinder sleeves 102 and 104 consequently share a common axis and are arranged in opposition to one another. Cylinder sleeve 102 is provided with intake ports 106 which communicate with the atmosphere; similarly, lower cylinder sleeve 104 is provided with intake ports 108. Cylinder sleeve 102 is preferably constructed of a metal which has suitable weight, wear, and bearing characteristics, such as brass or aluminum, for example.

Piston head 92 is provided with an end flange 110 at its upper end, and a shoulder 112, which, together, define a piston ring groove 114. A resilient seal 116 is mounted in groove 114. Resilient seal 116 is of a type known as a "U-cup seal" to those skilled in the art. Seal 116 is provided with a flared, relatively thin, flexible outer rim 118 which fits closely against the inner surface of cylinder sleeve 102 and which flexes inwardly during the intake stroke so as to form a gap which permits the passage of air past seal 116, and which expands outwardly during the compression stroke to form a seal which prevents the escape of air. Similarly, lower piston head 94 is provided with a corresponding end flange 120 and shoulder 122 defining a groove 124 in which a U-cup seal 126 is mounted.

The seal arrangement described in the preceding paragraph has the advantages of simplicity and reliability; it will be understood, however, that many types of valves and seals are known to those skilled in the art which could be substituted for the seal arrangement illustrated so as to admit air into the cylinder sleeve during the intake stroke, without departing from the spirit or scope of the present invention.

Cylinder sleeve 102 is capped at its upper end by cylinder head 130. Cylinder head 130 is provided with an exhaust port 132 which communicates with a T-shaped exhaust passage 134 within a central nipple 136, which extends longitudinally from the outer end of cylinder head 130. An elastomeric sleeve 138 fits closely about the exterior of nipple 136, covering the open ends of T-shaped exhaust passage 134. Elastomeric sleeve 138 provides a one-way exhaust valve from the interior of cylinder sleeve 102: as air is compressed by piston head 92 during the compression stroke so that the pressure of the air in cylinder sleeve 102 exceeds that exterior to elastomeric sleeve 138. The air vents through exhaust port 132 and exhaust passage 134, and expands elastomeric sleeve 138 outwardly about nipple 136, so as to escape through a gap formed intermediate nipple 136 and elastomeric sleeve 138. During the intake stroke of piston 92, when the air pressure exterior to elastomeric sleeve 138 exceeds that in cylinder sleeve 102, elastomeric sleeve 138 is forced against the open ends of exhaust passage 134 by the pressure differential, effectively sealing the open ends of T-shaped exhaust passage 134.

Here again, the exhaust valve arrangement described in the preceding paragraph is advantageous in its simplicity and reliability; however, many other types of exhaust valves could be substituted for the nipple and elastomeric sleeve arrangement illustrated so as to permit the venting of compressed air from the cylinder sleeve during the compression stroke. For example, a flapper valve arrangement may be provided by eliminating nipple 136 and exhaust passage 134 so as to provide a relatively flat outer cylinder head end, and positioning a thin flap of elastomeric material or metal shim stock over the open upper end of exhaust port 132.

Lower cylinder sleeve 104 is similarly provided with a cylinder head 140 having an exhaust port 142 leading to a T-shaped exhaust passage 144 in longitudinally extending nipple 146, which has an elastomeric sleeve 148 fitted over the open ends of exhaust passage 144.

A manifold chamber 149 is formed about nipple 136 on cylinder head 130 between an inner manifold case 150, which is sealingly mounted to the outer end of cylinder head 130, and an outer manifold case 152, which is sealingly mounted to inner manifold case 150. Accordingly, compressed air is vented through T-shaped exhaust passage 134 and nipple 136 into manifold chamber 149.

A manifold chamber 154 is similarly formed about longitudinally extending nipple 146 of lower cylinder head 140 by inner manifold case 156 and outer manifold case 158. The outer manifold case 158 fitted to lower cylinder head 140 is further provided with a central boss 160 having an internally threaded passageway 162 in communication with manifold chamber 154 which forms an attachment fitting for air hose 50 (see FIG. 1). Accordingly, compressed air introduced into manifold chamber 154 by the action of pump assembly 84 is discharged through opening 162 and air hose 50 to the article to be inflated.

A hollow equalizer tube 170 has an open upper end 172 which penetrates manifold case 150, and is sealed thereto, so that the interior of equalizer tube 170 communicates with manifold chamber 149. The lower end 174 of equalizer tube 170 similarly penetrates inner manifold case 156. Accordingly, compressed air discharged into upper manifold chamber 149 during the compression stroke of upper piston 92 flows through equalizer tube 170 and enters lower manifold chamber 154. Thus, the compressed air from each cylinder 102, 104 enters manifold chamber 154 and is discharged through opening 162.

Figure 8:
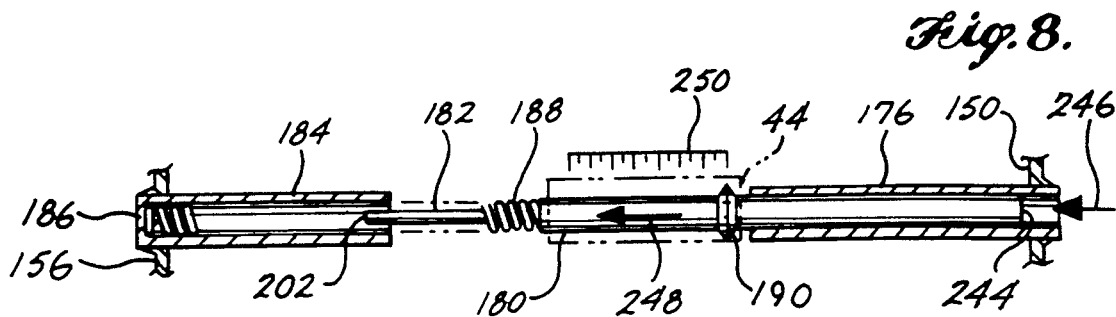
FIG. 8 is a side view of a longitudinal section of the pressure indicator section of the pump of FIGS. 1-7.

Inner manifold case 150 is also penetrated by hollow pressure indicator tube 176 so as to establish communication between upper manifold chamber 149 and the interior of pressure indicator tube 176. As is also shown in FIG. 8, a pressure indicator rod 180 is slidingly received in pressure indicator tube 176, and has a closed end which forms a seal in tube 176, and against which air pressure which enters pressure indicator tube 176 from manifold chamber 149 bears. A guide rod 182 extends coaxially from the opposite end of pressure indicator rod 180, and has a lower end which extends into an upper portion of hollow guide tube 184. The lower end 186 of guide tube 184 is sealed to prevent the escape of compressed air therethrough from lower manifold chamber 154. A coil spring 188 surrounds guide pin 182 and extends from the lower end of indicator rod 180 into guide tube 184 to closed lower end 186. The lower end of pressure indicator rod 180 and the upper end of guide tube 184 are open to the atmosphere (within housing 40). Accordingly, an air pressure in upper manifold chamber 149 which exceeds atmospheric pressure will tend to force pressure indicating rod 180 downwardly out of pressure indicating tube 176. Spring 188 regulates the amount or distance which indicator rod 180 is displaced by a particular pressure differential. A marker ring 190 is visible from the exterior of the case through window 144, and its position can be compared with a scale on the exterior of the case to determine the pressure of the air in manifold chamber 149. Inasmuch as upper manifold chamber 149 communicates through equalizer tube 170 and lower manifold chamber 154 with air hose 50 and the article being inflated, the pressure to which the article has been inflated can thus be determined. While the pressure gauge assembly described in this paragraph is particularly compact, sturdy, and reliable, other air gauge mechanisms, such as dial-type gauges, are known to those skilled in the art and may be suitably employed in the present invention.

Having described the components of pump assembly 84, the operation thereof will now be described in greater detail. With further reference to FIG. 3, it will be seen that the motion of drive chain 30 as crank assembly 20 is backpedalled in a reverse direction causes eccentric crank pin 98 to rotate in the direction indicated by arrow 194. The rotational motion of eccentric crank pin 98 in cooperation with bearing slot 96 causes double-ended piston rod 90 to reciprocate up and down as crank pin 98 moves repeatedly along a circular path. In the view shown in FIG. 3, crank pin 98 is shown located in a first position at a first end of bearing slot 96. In this position, piston rod 90 is in the middle of its stroke, and moving downward as indicated by arrow 196; accordingly, lower piston head 94 is moving downwardly in a compression stroke and compressing the air in cylinder sleeve 104 so that it exits through exhaust port 142 and exhaust passage 144, while upper piston head 92 is on an intake stroke in which air is moving past the rim 118 of seal 116 and into cylinder sleeve 102.

Figure 4:
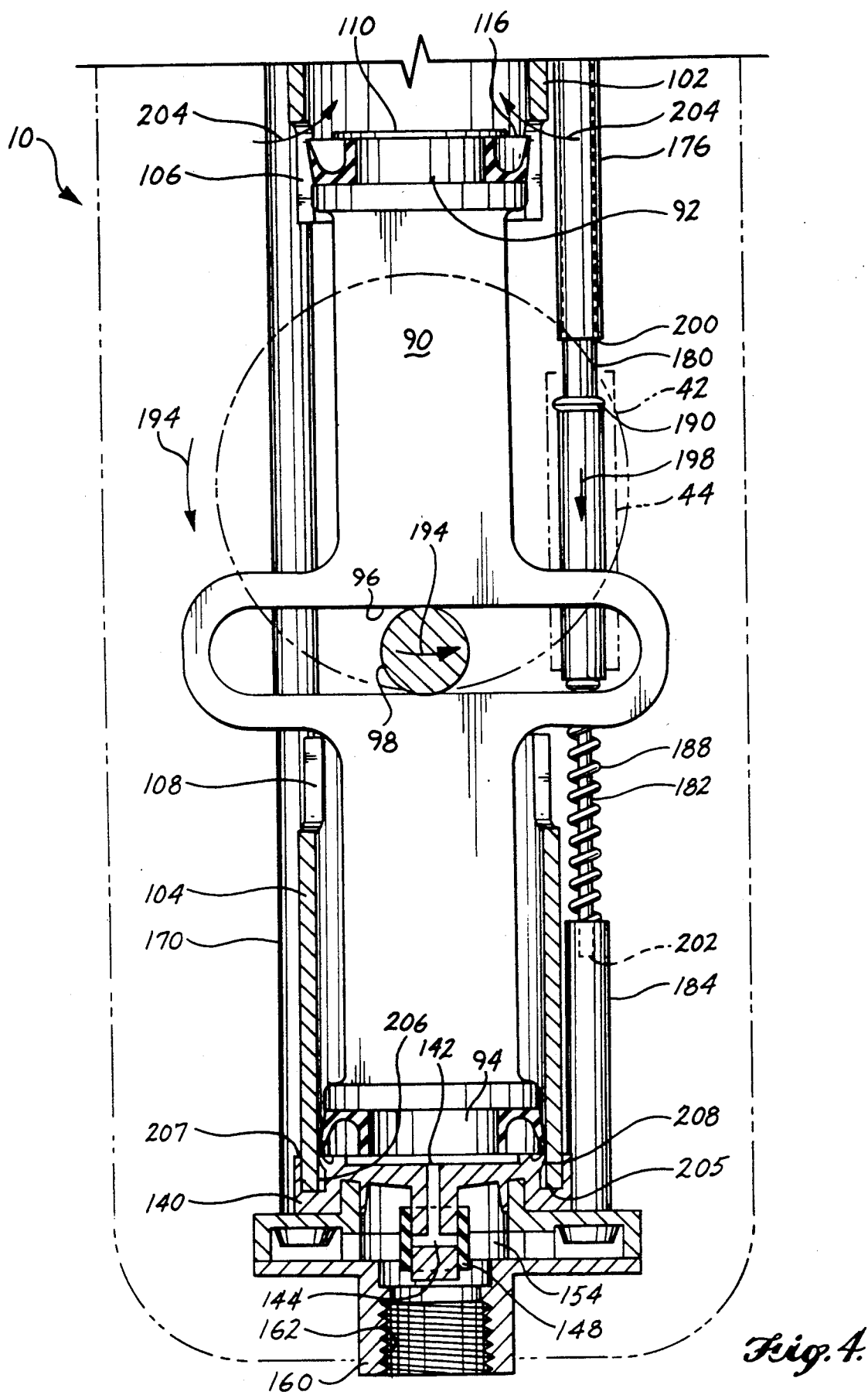
FIG. 4 is a side view of a lower portion of a section through the air pump of FIGS. 1-3, showing the rotation of the crank arm to a first position in which the lower piston is at the end of the compression stroke, and the upper piston is at the end of the intake stroke.

FIG. 4 shows a view in which the crank pin 98 has rotated 90° from the position in which it was shown in FIG. 3. Crank pin 98 is consequently located at the lowermost position along its circular path, and is centrally located in bearing slot 96. In this position, lower piston head 94 is at the end of its compression stroke, having forced the air in cylinder sleeve 104 out through exhaust port 142 and into lower manifold chamber 154. As was discussed above, the air pressure in manifold chamber 154 is transmitted via equalizer tube 170 and upper manifold chamber 149 to pressure indicator tube 176, forcing pressure indicating rod 180 downward in the direction indicated by arrow 198. Indicator ring 190 reacts against tube mouth 200 to limit movement in the opposite direction. It will be observed in FIG. 4 that the lower end 202 of guide pin 182 extends into guide tube 184 for only part of the length thereof, so as to provide room for rod 180 to be displaced downwardly without the lower end 202 of guide rod 182 contacting the lower end of guide tube 184.

With further reference to FIG. 4, it is seen that when upper piston head 92 is at the lower end of its intake stroke, the upper edge of seal 116 and flange 110 have moved below the upper edges of upper piston ports 106, thus admitting air from the atmosphere into the interior of cylinder sleeve 102 in the direction indicated by arrows 204. The interior of cylinder sleeve 102 is thus fully charged with air to atmospheric pressure prior to commencement of the compression stroke. The upper edges of piston ports 106 are preferably beveled or chamfered so as to prevent catching the edge of seal 116.

FIG. 4 also shows that the lower end of lower cylinder sleeve 104 is received in a circumferential groove 205 formed in the upper side of lower cylinder head 140. Circumferential groove 205 is bounded by inner wall 206 and outer wall 207. A circumferential angled skirt 208 depends from inner wall 206, and bears against the inner surface of cylinder sleeve 104 so as to form an effective seal. Skirt 208 may have, prior to installation, an outside diameter slightly greater than the inside diameter of cylinder sleeve 104, so that when installed skirt 208 is slightly compressed against the inner wall of cylinder sleeve 104, contributing to the effectiveness of the seal.

Figure 5:
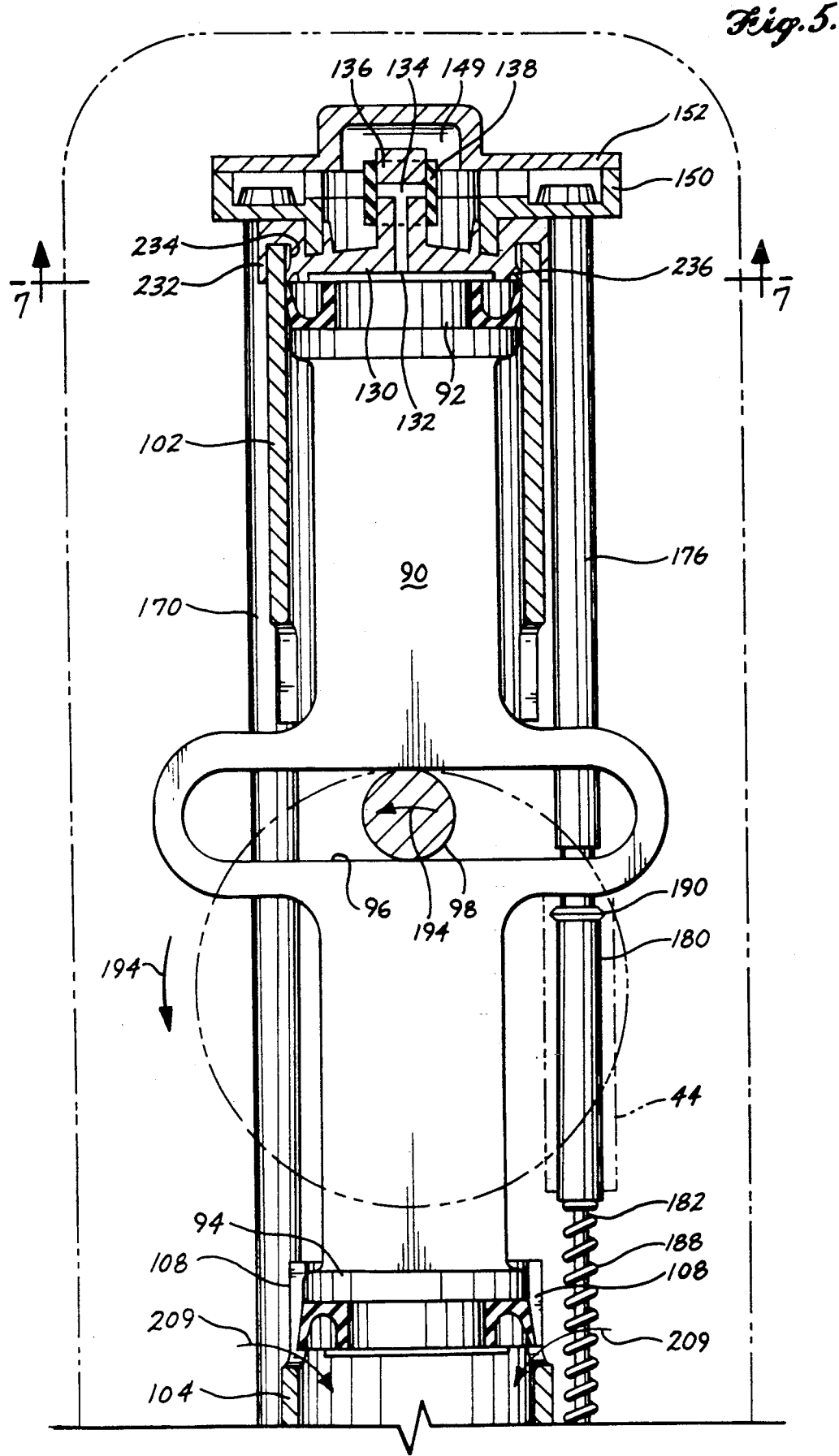
FIG. 5 is a view similar to that shown in FIG. 4, in which the crank arm has rotated to a second position in which the lower piston is at the end of the intake stroke and the upper piston is at the end of the compression stroke.

In FIG. 5, crank pin 98 has rotated 180° from the position shown in FIG. 4. In this position, piston rod 90 is at its uppermost position, so that upper piston head 92 is now at the end of its compression stroke, and lower piston head 94 is at the end of its intake stroke. Lower cylinder ports 108 are thus opened to admit air in the direction indicated by arrows 209.

Accordingly, it will be apparent that the double-piston arrangement of air assembly 10 provides two compression strokes for each revolution of drive sprocket 76 and crank pin 98. Not only does this provide a relatively constant flow of compressed air from the pump, but it also ensures a relatively rapid delivery of compressed air, particularly in view of the high speed of chain movement which can readily be achieved through manual rotation of the bicycle crank assembly. Still further, the excellent hand grip and mechanical advantage provided to the operator by crank arms 24 and pedals 26 of crank assembly 20 (see FIG. 1) renders it relatively easy for the operator to use pump assembly 10 to achieve the high air pressures required to inflate many articles. Additionally, rotating crank assembly 20 in a continuous circular motion is far more efficient than reciprocating the operator's hands and arms back and forth, as is required for operation of the conventional bicycle pumps described above, since the rotational motion eliminates the need to repeatedly accelerate and decelerate the mass of the operator's hands and arms; this advantage of the present invention is further enhanced by the flywheel effect of the rotating crank assembly 20 and freewheel gear cluster 28. It will also be appreciated that the air pump of the present invention utilizes the drive system of a conventional bicycle to achieve the foregoing advantages, yet, unlike the known cycle-mounted air pumps described above, does not rotate with a wheel of the bicycle and does not require that the bicycle be in motion; accordingly, the air pump of the present invention is useful for inflating stationary objects, and not just the tires of a moving bicycle.

Figure 6:
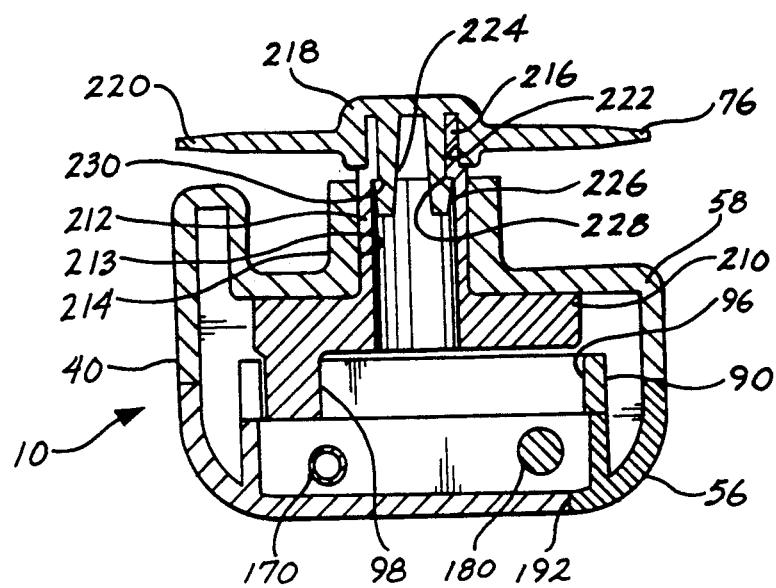
FIG. 6 is a bottom view of a section through the air pump of FIGS. 1-5, taken along line 6—6, showing the sprocket and crank assembly of the pump.
Figure 7:
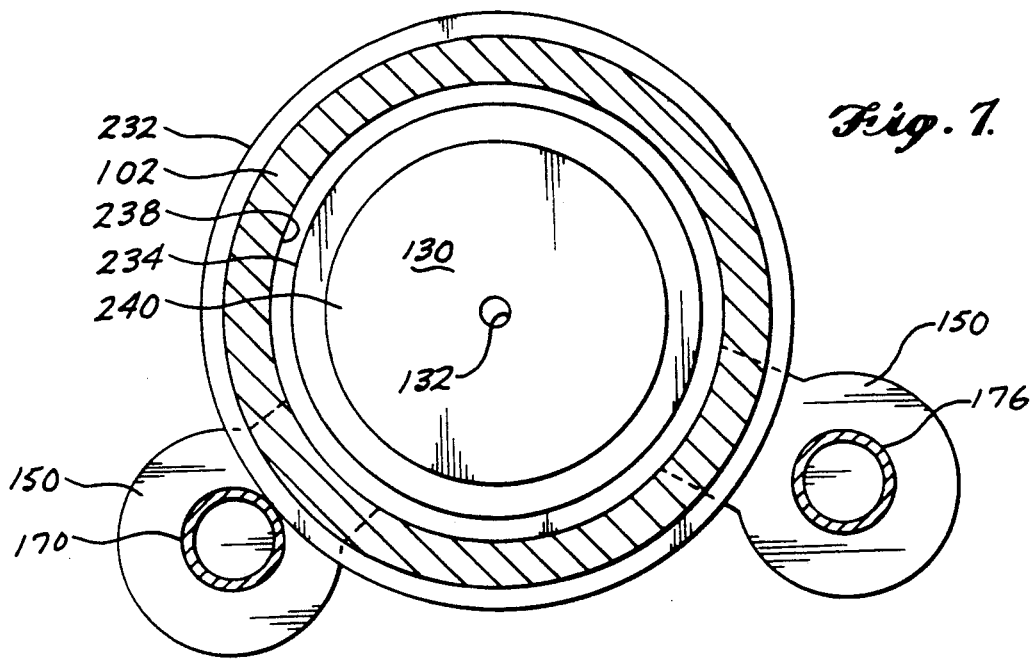
FIG. 7 is a bottom view of a cross section through the air pump of FIG. 5, taken along 7—7, showing the lower surface of the cylinder head thereof.

Turning now to FIGS. 6-8, the arrangement of several components of air pump assembly 10 will be described in greater detail. FIG. 6 shows the drive sprocket, crankshaft, and piston rod relationship. As was previously described, crank pin 98 is retained in bearing slot 96 in double-ended piston rod 90. Crank pin 98 is mounted proximate the periphery of crank wheel 210, and hollow crankshaft 78 extends axially from the center of crank wheel 210 through a cooperating bore 213 formed in a boss 214 which extends from rear case section 58. The outer end 216 of crankshaft 78 is provided with external splines. Crankshaft 78, crank wheel 210, and crank pin 98 are preferably fabricated unitarily of a suitable material, such as nylon or Delrin TM.

Drive sprocket 76 has a central hub 218 about which teeth 220 are radially distributed. The inner face of hub 218 is provided with a cylindrical receptacle 222 which has internal splines about its perimeter which are configured to mate with and engage the external splines on crankshaft end 216. Locking fingers 224 project outwardly from cylindrical receptacle 222 about the axis of hub 218 and are configured to fit closely within the interior of the open upper end 216 of crankshaft 78. The lower end of each locking finger 224 has a ramp 226 on its outer face which slopes outwardly from its lower end, and a notch 228 at the upper terminus of the ramp 226. To fit sprocket 76 to crankshaft 78, locking fingers 224 are pressed into the open upper end 216 of crankshaft 78, ramps 228 cause fingers 224 to flex inwardly toward the axis of sprocket 76, until notches 228 reach internal shoulders 230 inside crankshaft 78, so that fingers 224 expand outwardly. Sprocket 76 is consequently secured on crankshaft 78 by the abutment of notches 228 with shoulder 230, and the splines on sprocket 76 and crankshaft 78 are engaged so that rotation of sprocket 76 causes rotation of crankshaft 78.

FIG. 7 shows the relationship of cylinder head 130 with upper cylinder sleeve 102. The wall of cylinder sleeve 102 is received in a groove defined intermediate outer wall 232 and inner wall 234 of cylinder head 130 (see also FIG. 5). Circumferential cylinder head skirt 236 extends from inner wall 234 and abuts the inner surface 238 of cylinder sleeve 102 so as to form a seal, as was described above with reference to FIG. 4. Central portion 240 of cylinder head 130 is recessed relative to inner wall 234 to receive the upper flange 110 of upper piston head 92, so as to help ensure complete discharge of the air in cylinder sleeve 102 during the final phase of the compression stroke. Exhaust port 132 is centrally located in recessed portion 240.

Also visible in FIG. 7 are equalizer tube 170 and pressure indicator tube 176, which extend downwardly from manifold case 150.

FIG. 8 shows the pressure indicator portion of air pump assembly 10 which was described above with reference to FIG. 3. As noted above, air pressure in upper manifold chamber 149 acts against the end of indicator rod 180 in the direction indicated by arrow 246, tending to push or deflect pressure indicator rod 180 out of tube 176 in the direction indicated by arrow 248. The position of indicator ring 190 can be viewed through window 44 and compared with scale markings 250 to conveniently and accurately determine the air pressure.

In an air pump assembly 10 as has been described above, cylinder sleeves 102, 104 having cylinder bores of about 0.650", and a crank wheel 210 and crank pin 98 providing a stroke of about 1.00", have been found eminently suitable for use for inflating the tires of bicycles, such as mountain bikes, which have relatively large, low-pressure tires; for bicycles having relatively small, high-pressure tires, it may be preferable to employ somewhat smaller bores, on the order of about 0.50" for example, with the 1.00" stroke. Furthermore, it may be desirable in some versions of the present invention to provide an air pump assembly having first and second sleeves with different sized bores, one for attaining relatively low inflation pressures and the other for attaining relatively high inflation pressures.

Figure 11:
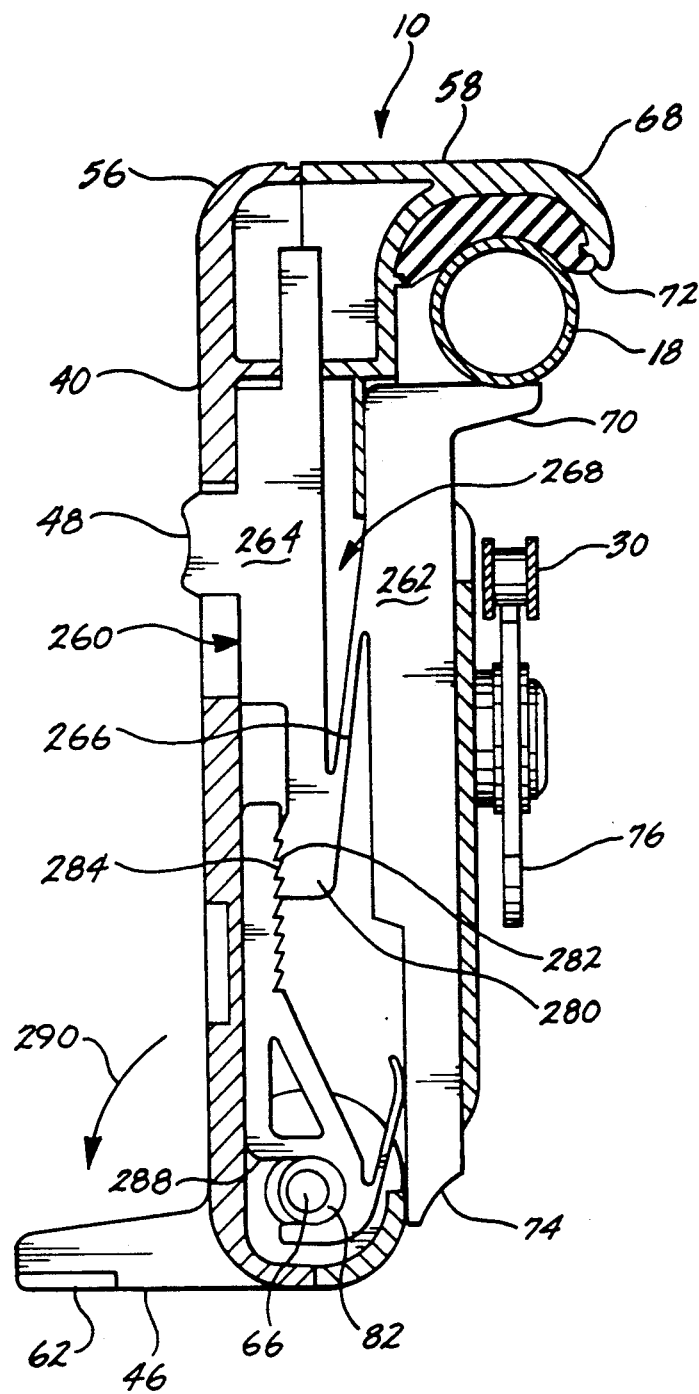

Turning now to FIGS. 9-11, the mechanism and procedure for mounting an air pump according to the present invention to a bicycle will be described. FIG. 9 shows air pump assembly 10 as initially positioned on bicycle 12. To achieve this initial position, the operator positions drive chain 30 on the upper portion of sprocket 76, and then lifts hook portion 68 over chain stay 18 so that mandible 70 is positioned beneath chain stay 18. As used in this description and the appended claims, the terms vertical, horizontal, up, down, and the like refer to orientations, directions, and the like with respect to the normal upright orientation of a bicycle.

Mandible 70 is an integral portion of a clamping member 260 which is movable vertically within slot 80 in housing 40. Clamping member 260 comprises (a) a vertically elongate jaw portion 262 and (b) a vertically elongate locking portion 264, which are interconnected by (c) an elongate, relatively narrow bridge portion 266. Bridge portion 266 is semirigid and extends in an angled direction, relative to the jaw and locking portions so as to bias these apart from one another so that they are separated by vertically extending gap 268. Bridge portion 266 readily bends or flexes inwardly when pressure is applied manually to release button 48, however, it is sufficiently rigid that adequate upwardly directed compressive forces will be transmitted through bridge 266 from locking portion 264 to jaw portion 262 to establish an effective grip on chain stay 18 between mandible portion 70 and hook portion 68, as will be described below. In a clamping member fabricated unitarily of Delrin ™, a bridge portion 266 angled at 10° from vertical and having a width of about 0.125 inches and a thickness of about 0.06 inches has been found suitable. Furthermore, while bridge 266 is a particularly inexpensive and effective structure for interconnecting the jaw and locking portions as described in this paragraph, those skilled in the art will recognize that other structures may be used to achieve this relationship in the clamping member of the present invention; for example, a coil spring may be used to bias the jaw and locking portions apart while vertically abutting portions transmit the force in the vertical direction.

A guide rod 270 extends upwardly from locking portion 264, and passes through cooperating bore 272 formed in case sections 56 and 58, so as to maintain the vertical alignment of locking portion 264. Similarly, push rod 74 extends downwardly from jaw portion 262 and passes through cooperating bore 276 in rear case section 58.

A ratchet portion 280 extends downwardly from locking portion 264, and is provided with ratchet teeth 282. Ratchet teeth 282 are configured to engage ratchet teeth 284 on ratchet actuator 286, when biased into contact therewith by bridge portion 266. Ratchet teeth 282, 284 permit clamping member 260 to move upwardly with respect to ratchet actuator 286 while the teeth are in engagement, but prevent downward movement of these parts while engaged.

The lower end of ratchet actuator 286 is provided with a transverse slot 288 having an upper side, which abuts cam 82. The lower end of ratchet actuator 286 is also provided with a spring blade 290 which bears against the side of push rod 74 so as to bias the lower end of ratchet actuator 286 towards cam 82 in order to maintain it in position in slot 288.

The next step in the mounting procedure is to manually reduce the gap between mandible 70 and chain stay 18. The operator presses upwardly on the lower end of push rod 74, causing the entire clamping member 260 to move upwardly, ratchet portion 280 moving upwardly relatively to ratchet actuator 286. A minimum gap between intermediate mandible 70 and chain stay 18 is thus quickly attained, as is shown in FIG. 10. Preferably, the gap 294 intermediate mandible 70 and the lower portion of chain stay 18 is reduced to a distance which is less than the vertical travel between adjacent pairs of teeth 282, 284.

In the final mounting step, the operator rotates lever 46 outwardly and downward in the direction indicated by arrow 290 in FIG. 11. This rotates cam 82 in slot 288, causing ratchet actuator 286 to move upwardly relative to housing 40. The upwardly directed force is transmitted through teeth 282, 284 to ratchet portion 280, and through angled bridge portion 266 to jaw portion 262, thereby reducing the gap between mandible 70 and rear hook portion 68 of housing 40. Mandible 70 contacts the lower portion of chain stay 18 and forces the upper portion of chain stay 18 into resilient cushioning insert 72. Chain stay 18 is thus firmly gripped between mandible 70 and hook 68, so as to keep air pump assembly 10 stationary during its operation. Resilient insert 72 increases the effectiveness of this grip, and also reduces the possibility of damaging ratchet teeth 282, 284 and chain stay 18.

In order to release air pump assembly 10 from the bicycle, the operator first returns clamping lever 46 to the released position shown in FIG. 10. The operator then presses release button 48 inwardly into housing 40. This bends bridge 266 and moves locking portion 264 towards jaw portion 262 so as to disengage ratchet teeth 282, 284. Clamping member 260 is thus freed to move downwardly in housing 40 relative to ratchet actuator 286, widening the gap between mandible 70 and hook 68. In some versions, it may be desirable to provide a spring assist for moving clamping member 60 downwardly; for example, a coil spring may be positioned about guide rod portion 270.

It is to be recognized that various modification could be made to the illustrative embodiments without departing from the spirit and scope of the present invention. Accordingly, the invention is not to be limited except as by the appended claims.

What is claimed and desired to be secured by Letters Patent of the United States is:

1. A method for pumping air using a bicycle having a frame, a crank assembly rotatably mounted to said frame, a wheel rotatably mounted to said frame, a free wheel gear cluster attached to said wheel for rotating said wheel when said gear cluster is caused to rotate in a forward direction and for rotating independently of said wheel when said gear cluster is rotated in a reverse direction, and a drive chain having upper and lower chain runs interconnecting said crank assembly and said free wheel gear cluster and extending along upper and lower paths, respectively, said method comprising:

providing an air pump having a housing that includes a drive sprocket and pumping means for pumping air in response to rotation of said drive sprocket, and a finger-operated clamp that is integral with the housing of the air pump;

mounting said air pump to said frame of said bicycle with the finger-operated clamp so that said air pump is stationary relative to said frame but can be quickly and easily detached from said frame;

moving a selected one of said upper and lower runs of said drive chain substantially away from its respective path and engaging said selected one of said runs with said drive sprocket; and rotating said crank assembly and said free wheel gear cluster in a reverse direction so that said selected one of said runs moves past said drive sprocket so as to rotate said drive sprocket, whereby said pumping means of said stationary air pump is operated while said wheel of said bicycle remains stationary.

2. A method for pumping air using a bicycle having a frame, a crank assembly rotatably mounted to said frame, a wheel rotatably mounted to said frame, a wheel sprocket rotatably mounted to the wheel for rotating the wheel when the wheel sprocket is rotated in a forward direction, and a drive chain having upper and lower chain runs interconnecting said crank assembly and said wheel sprocket and extending along upper and lower paths, said lower path extending through a chain tensioning device, said method comprising:

providing an air pump having a drive sprocket and pumping means operable for pumping air in response to rotation of said drive sprocket;

positioning said air pump proximate said bicycle so that said air pump is stationary relative to said bicycle;

moving the lower chain run away from its path and engaging said lower run with said drive sprocket on said air pump so as to substantially deflect the chain tension device to a forward position, thereby placing the lower chain run in tension between the chain tensioning device and the drive sprocket during rotation of the wheel sprocket in a reverse direction; and rotating said crank assembly and said wheel sprocket in the reverse direction so that said lower run of the drive chain moves past said drive sprocket and rotates said drive sprocket thereby causing said pumping means to pump air in response to said rotation of said crank assembly.

3. The method of claim 2, wherein the step of positioning said air pump proximate said bicycle comprises mounting said air pump to said bicycle so that said air pump is stationary relative to said bicycle and may be quickly and easily detached from said bicycle.

4. The method of claim 2, wherein said wheel sprocket of said bicycle is a free wheel, said free wheel being configured to rotate said wheel of said bicycle when rotated in a forward direction and to rotate independently of said wheel of said bicycle when rotated in a reverse direction, and the step of rotating said crank assembly in said reverse direction occurs while said wheel remains stationary.

5. An air pump designed for use with a bicycle having a frame, a first elongate tube, a wheel rotatably mounted to the frame, a crank assembly rotatably mounted to the frame, at least one gear attached to the wheel, the at least one gear being designed to cause the wheel to rotate in a first direction when the gear is driven in the first direction, a drive chain designed and having a length and tension selected so that the chain engages and couples the crank assembly and the at least one gear so as to transmit rotational drive from the crank assembly to the at least one gear when the crank assembly is caused to rotate, the chain including first and second runs extending along upper and lower paths, respectively, located adjacent the first elongate tube, the air pump comprising:

a housing having a hollow interior;

clamp means integral with said housing, for releasably securing said housing to a selected portion of the first tube so as to permit said housing to be quickly secured to, and quickly detached from, the first tube;

a sprocket rotatably mounted to said housing in fixed, predetermined spaced relation to said clamp assembly, said sprocket being designed to engage and be rotatably driven by the chain, wherein said sprocket is sized and said predetermined spaced relation is selected so that when said housing is secured to the first tube and one of the first and second runs of the chain is engaged with said sprocket, said one run of chain will be deflected form its respective path an amount sufficient to increase the tension in the chain such that said one run is maintained in driving engagement with said sprocket when the chain is driven by the crank assembly; and pump means, positioned in said interior of said housing and coupled with said sprocket, for providing a stream of compressed air in response to rotation of said sprocket.

6. A pump according to claim 5, wherein said pump means includes (a) at least one cylinder sleeve mounted in said interior of said housing and (b) a piston rod having a first piston head mounted in said at least one cylinder sleeve so that said first piston head may be driven in a first direction constituting an intake stroke and in a second direction constituting a compression stroke, wherein said at least one cylinder and said first piston head are designed so that air located in said at least one cylinder sleeve is compressed during said compression stroke.

7. A pump according to claim 6, further wherein said piston rod includes a middle portion having a bearing slot that extends normally to the longitudinal axis of the piston rod, and said pump means further includes a crankshaft rotatably mounted in said interior of said housing, said crankshaft including a crank pin, said crankshaft, said crank pin and said bearing slot being designed and positioned relative to one another so that rotational movement of said crankshaft is transmitted to said piston rod so as to cause said piston rod to reciprocate linearly in said housing.

8. A pump according to claim 6, wherein said pump means further comprises:

first means for admitting air from the region surrounding said housing into said at least one cylinder sleeve during each intake stroke of said first piston head;

second means for venting from said at least one cylinder sleeve air that is compressed in said at least one cylinder sleeve during each compression stroke of said first piston head;

at least one manifold positioned in said housing for receiving said compressed air vented from said at least one cylinder sleeve; and a conduit for supplying said compressed air from said manifold to an article to be inflated.

9. A pump according to claim 5, wherein said clamp assembly includes (a) a first member attached to said housing proximate to said sprocket, said first member being designed to engage one side of the first tube, (b) a second member designed and mounted to said housing so as to be movable between (i) a first position where said second member confronts said first member and is spaced from said first member a distance such that when said first member engages one side of the first tube said second member will engage an opposite side of the first tube with an engagement force sufficient to secure said housing to the first tube and (ii) a second position where said first and second members are spaced a distance greater than the cross-sectional thickness of the first tube, and (c) means, coupled to said second member, (i) for causing said second member to move between said first and second positions and (ii) for urging said second member against said opposite side of the first tube with a force equal to said engagement force when said second member has been moved to said second position.

10. A pump according to claim 5, further comprising indicator means for indicating the pressure of said stream of compressed air provided by said pump means.

11. A pump according to claim 5, wherein said pump means is additionally designed to provided said stream of compressed air regardless of the direction of rotation of said sprocket.

12. An air pump designed for use with a bicycle having a frame, a chain stay having first and second ends, a wheel rotatably mounted to the frame adjacent the first end of the chain stay, a crank assembly rotatably mounted to the frame adjacent the second end of the chain stay, a free wheel attached to the wheel, the free wheel being designed (a) to cause the wheel to rotate in a first direction when the free wheel is driven in a first direction, and (b) to rotate independently of the wheel when the free wheel is driven in an opposite direction, a drive chain interconnecting and engaging the crank assembly and free wheel so as to transmit rotational drive from the crank assembly to the free wheel, the chain having upper and lower runs extending along upper and lower paths, respectively, located adjacent and substantially parallel to the chain stay, and a derailleur for adjusting the position of the chain relative to the free wheel and for maintaining the chain under a predetermined tension, the air pump comprising:

a housing having a hollow interior;

a clamp assembly, including an integral lip on said housing and a movable, hand-actuated clamp plate, for releasably securing said housing to a selected portion of the chain stay by clamping the chain stay between the lip and the movable, hand-actuated clamp plate so as to permit said housing to be quickly secured to, and quickly detached from, the chain stay;

a sprocket rotatably mounted to said housing in fixed, predetermined spaced relation to said clamp assembly, said sprocket being designed to engage and be rotatably driven by the chain, wherein said sprocket is sized and said predetermined spaced relation is selected so that when said housing is secured to the chain stay near a mid-length portion thereof, and one of the upper and lower runs of the chain is wrapped around said sprocket so as to engage said sprocket, said one run of the chain will be deflected from its respective path an amount sufficient to increase the tension in the chain such that said one run is maintained in driving engagement with said sprocket when the chain is driven by the crank assembly;

a crankshaft rotatably mounted in said interior of said housing, said crankshaft being coupled with said sprocket so that rotation of said sprocket causes said crankshaft to rotate; and a pump assembly, positioned in said interior of said housing and coupled with said crankshaft, for providing a stream of compressed air in response to rotation of said crankshaft.

13. A pump according to claim 12, further comprising:

a first manifold mounted to said first cylinder sleeve for receiving compressed air vented from said first cylinder sleeve;

a second manifold mounted to said second cylinder sleeve for receiving compressed air vented from said second cylinder sleeve; and an equalizer tube having a first end attached to said first manifold and a second end attached to said second manifold so as to permit said compressed air to flow from said first manifold to said second manifold.

14. A pump according to claim 12, wherein said pump assembly further includes:

first and second cylinder sleeves positioned in said interior of said housing in opposed relation; and a double-ended piston rod having a first piston head positioned in said first cylinder sleeve and a second piston head positioned in said second cylinder sleeve, said piston rod being reciprocally mounted in said housing so that (a) when said piston rod is driven in a first direction said first piston head undergoes a compression stroke and said second piston head undergoes an intake stroke and (b) when said piston rod is driven in a second direction said first piston head undergoes an intake stroke and said second piston head undergoes a compression stroke, said first and second cylinder sleeves and said first and second piston heads being designed so that air located in said first and second cylinder sleeves will be compressed during respective compression strokes of said first and second piston heads, further wherein said piston rod includes a middle portion having a bearing slot extending normally to the longitudinal axis of the piston rod.

15. A pump according to claim 14, wherein said crankshaft includes a crank pin designed to be received in said bearing slot in said piston rod, further wherein said crankshaft, said crank pin and said bearing slot are designed and positioned relative to one another so that rotation of said crankshaft is transmitted to said piston rod via said crank pin, when the latter is received in said bearing slot, so as to cause said piston rod to reciprocate linearly in said housing and drive each of said first and second piston heads through respective intake and compression strokes.

16. A pump according to claim 12, further comprising indicator means for indicating the pressure of compressed air delivered from said pump means.

17. A device for pumping air comprising:

a bicycle having a frame, a first elongate tube, a wheel rotatably mounted to said frame, a crank assembly rotatably mounted to said frame, at least one gear attached to said wheel, said at least one gear being designed to cause said wheel to rotate in a first direction when said gear is driven in the first direction, a drive chain running through a chain tensioning device that applies tension to the chain so that the chain engages and couples said crank assembly and said at least one gear to transmit rotational drive from said crank assembly to said at least one gear when the crank assembly is rotated in a forward direction, said chain including first and second runs extending along upper and lower paths, respectively, located adjacent said first tube;

a housing having a hollow interior;

clamp means, coupled to said housing, for releasably securing said housing to a selected portion of said first tube so as to permit said housing to be quickly secured to, and quickly detached from, said first tube;

a sprocket rotatably mounted to said housing in fixed, predetermined spaced relation to said clamp assembly, said sprocket being designed to engage and be rotatably driven by said chain, wherein said sprocket is sized and said predetermined spaced relation is selected so that when said housing is secured to said first tube and said second run of said chain is engaged with said sprocket, said second run of chain will be deflected from its path an amount sufficient to deflect the chain tensioning device forward and increase the tension in the chain such that said second run is maintained in driving engagement with said sprocket when the chain is driven by the crank assembly in a reverse direction; and pump means, positioned in said interior of said housing and coupled with said sprocket, for providing a stream of compressed air in response to reverse rotation of said crank assembly.

* * * * *